(12) United States Patent
Marriott

(10) Patent No.: US 6,501,629 B1
(45) Date of Patent: Dec. 31, 2002

(54) HERMETIC REFRIGERATION COMPRESSOR MOTOR PROTECTOR

(75) Inventor: Lee W. Marriott, Ypsilanti, MI (US)

(73) Assignee: Tecumseh Products Company, Tecumseh, MI (US)

( * ) Notice: Subject to any disclaimer, the term of this patent is extended or adjusted under 35 U.S.C. 154(b) by 153 days.

(21) Appl. No.: 09/697,631

(22) Filed: Oct. 26, 2000

(51) Int. Cl.$^7$ .............................................. H02H 7/00
(52) U.S. Cl. ........................................................ 361/22
(58) Field of Search ............................. 361/22, 23, 24, 361/30

(56) References Cited

U.S. PATENT DOCUMENTS

| | | | |
|---|---|---|---|
| 2,992,365 A | 7/1961 | Brill ............................. | 317/51 |
| 3,137,163 A | 6/1964 | Engelmann ................... | 73/136 |
| 3,789,236 A | 1/1974 | Lacroix ........................ | 307/96 |
| 4,123,792 A | 10/1978 | Gephart et al. ............... | 361/30 |
| 4,180,768 A | 12/1979 | Ferraro ......................... | 323/9 |
| 4,187,525 A | 2/1980 | Nagura et al. ................. | 361/42 |
| 4,333,118 A | 6/1982 | Comstedt et al. ............. | 361/30 |
| 4,384,312 A | * 5/1983 | Fry ............................... | 361/24 |
| 4,616,179 A | 10/1986 | Braun .......................... | 324/158 |
| 4,659,976 A | 4/1987 | Johanson .................... | 318/332 |
| 4,864,287 A | 9/1989 | Kierstead .................... | 340/648 |
| 4,989,155 A | 1/1991 | Begin et al. ................. | 364/483 |
| RE33,874 E | 4/1992 | Miller .......................... | 361/79 |
| 5,345,158 A | 9/1994 | Kliman et al. .............. | 318/434 |
| 5,463,874 A | * 11/1995 | Farr ............................. | 62/126 |
| 5,473,497 A | 12/1995 | Beatty ......................... | 361/23 |
| 5,548,464 A | * 8/1996 | Manning .................... | 361/123 |
| 5,742,522 A | 4/1998 | Yazici et al. ........... | 364/551.01 |
| 5,930,092 A | 7/1999 | Nystrom ..................... | 361/30 |
| 5,995,351 A | * 11/1999 | Katsumata et al. ......... | 361/105 |
| 6,364,619 B1 | * 4/2002 | Williams et al. ............. | 417/32 |

\* cited by examiner

*Primary Examiner*—Adolf Deneke Berhane
(74) *Attorney, Agent, or Firm*—Baker & Daniels

(57) ABSTRACT

The present invention provides a device and method for protecting the motor of a hermetic refrigeration compressor. The device comprises a motor, input power lines, and a motor protector connected to the input power lines to control the power to the motor. The motor protector includes a microprocessor, an input power measurement device, and a switch means for controlling the connection of the power lines to the motor. The input power measurement device includes a motor power input signal to the microprocessor. The microprocessor includes memory having instructions for storing an operating input power limit range based on the torque limits of the motor and for comparing the power input signal to the operating input power limit range of the motor. The microprocessor controls the switch means to open when the input power signal is outside of the operating input power limit range of the motor. The method includes the steps of providing a motor protector having a microprocessor with memory and an input power switch, storing an operating input power limit range based on the torque limits of the compressor motor in the memory of the microprocessor, measuring the input power to the compressor motor, providing the measured input power to the microprocessor, comparing the measured input power value to the operating input power limit range of the compressor motor, and opening the input power switch to remove power from the compressor motor when the measured input power value is outside of the operating input power limit range.

7 Claims, 4 Drawing Sheets

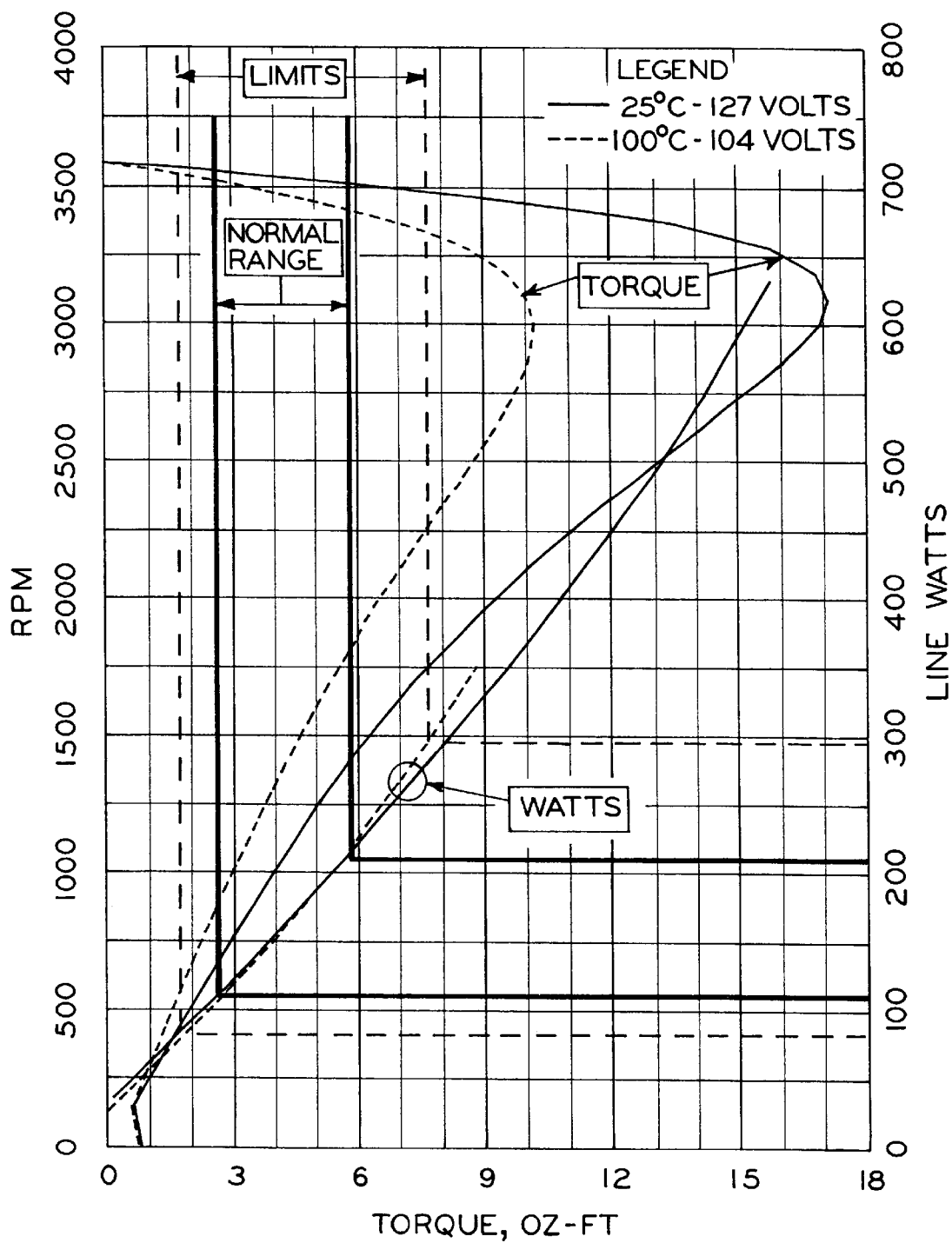
FIG_4

HERMETIC REFRIGERATION COMPRESSOR MOTOR PROTECTOR

BACKGROUND OF THE INVENTION

1. Field of the Invention

The present invention relates generally to motor protectors for hermetic refrigeration compressors.

2. Description of the Related Art

Present hermetic compressor motor microprocessor protection devices monitor motor line voltages, line currents, and other inputs such as temperature and motor speed to determine the state of an operating compressor. Motor speed is sometimes used as an estimate of torque, but as seen in FIG. 4 in the normal operating range of torque, the motor speed can vary significantly depending upon the motor operating temperature. Software algorithms are used to determine whether the compressor is operating within acceptable electrical, load, and thermal limits.

SUMMARY OF THE INVENTION

The present invention involves a method and device for protecting a refrigeration compressor motor from operating outside of its torque or load operating limits by using the input power to the motor. Input power correlates strongly to motor torque especially in the normal operating range of the motor. An input power range is determined for the compressor motor by measuring the input power at the extreme operating limits of the compressor over the torque or load range of the compressor. The motor input power is either directly measured in hardware or calculated in software using other hardware measurements such as input voltage and current. The attained motor input power is used as an input to a software algorithm to determine if the compressor is operating within acceptable torque operating limits. If the measured input power is found to be outside the determined input power range indicating the compressor motor is operating outside of its acceptable torque limits, the compressor motor will be shut down keeping the compressor motor from operating outside its torque operating range. Loss of refrigerant can cause an under-torque condition and loss of the condenser fan can cause an over-torque condition.

The present invention provides a motor protector system for a compressor. The system comprises a motor, input power lines, and a motor protector connected to the input power lines to control the power to the motor. The motor protector includes a microprocessor, an input power measurement device, and a switch means for controlling the connection of the power lines to the motor. The input power measurement device includes a motor power input signal to the microprocessor. The microprocessor includes memory having instructions for storing an operating input power limit range based on the torque limits of the motor and for comparing the power input signal to the operating input power limit range of the motor. The microprocessor controls the switch means to open when the input power signal is outside of the operating input power limit range of the motor.

The present invention provides a second embodiment of a motor protector system for a compressor. The system comprises a motor, input power lines, and a motor protector connected to the input power lines to control the power to the motor. The motor protector includes a microprocessor, voltage measurement device, current measurement device, and a switch means for controlling the connection of the power lines to the motor. The input voltage measurement device includes a motor voltage input signal to the microprocessor. The input current measurement device includes a motor current input signal to the microprocessor. The microprocessor includes memory having instructions for storing an operating input power limit range based on the torque limits of the motor, for calculating a power input value by using the voltage input signal and the current input signal, and for comparing the power input value to the operating input power limit range of the motor. The microprocessor controls the switch means to open when the input power value is outside of the operating input power limit range of the motor.

The present invention further provides a method of providing torque protection to a compressor motor. The steps comprise providing a motor protector having a microprocessor with memory and an input power switch, storing an operating input power limit range based on the torque limits of the compressor motor in the memory of the microprocessor, measuring the input power to the compressor motor, providing the measured input power to the microprocessor, comparing the measured input power value to the operating input power limit range of the compressor motor, and opening the input power switch to remove power from the compressor motor when the measured input power value is outside of the operating input power limit range.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 4 is a graph of motor speed and input motor power versus torque for a Tecumseh Products Company TP1380Y PSC motor.

DESCRIPTION OF THE PRESENT INVENTION

A microprocessor protective device according to the present invention is used to control the input power to the motor of a hermetic refrigeration compressor depending on the torque of the motor. The device uses a measurement or calculation of the input power to the motor to determine the torque of the motor and includes at least one measurement device, a switch means and a microprocessor. The measurement device provides either a measured power signal to the microprocessor or a signal or signals to the microprocessor that can be used to calculate the power to the motor.

Figure 1:
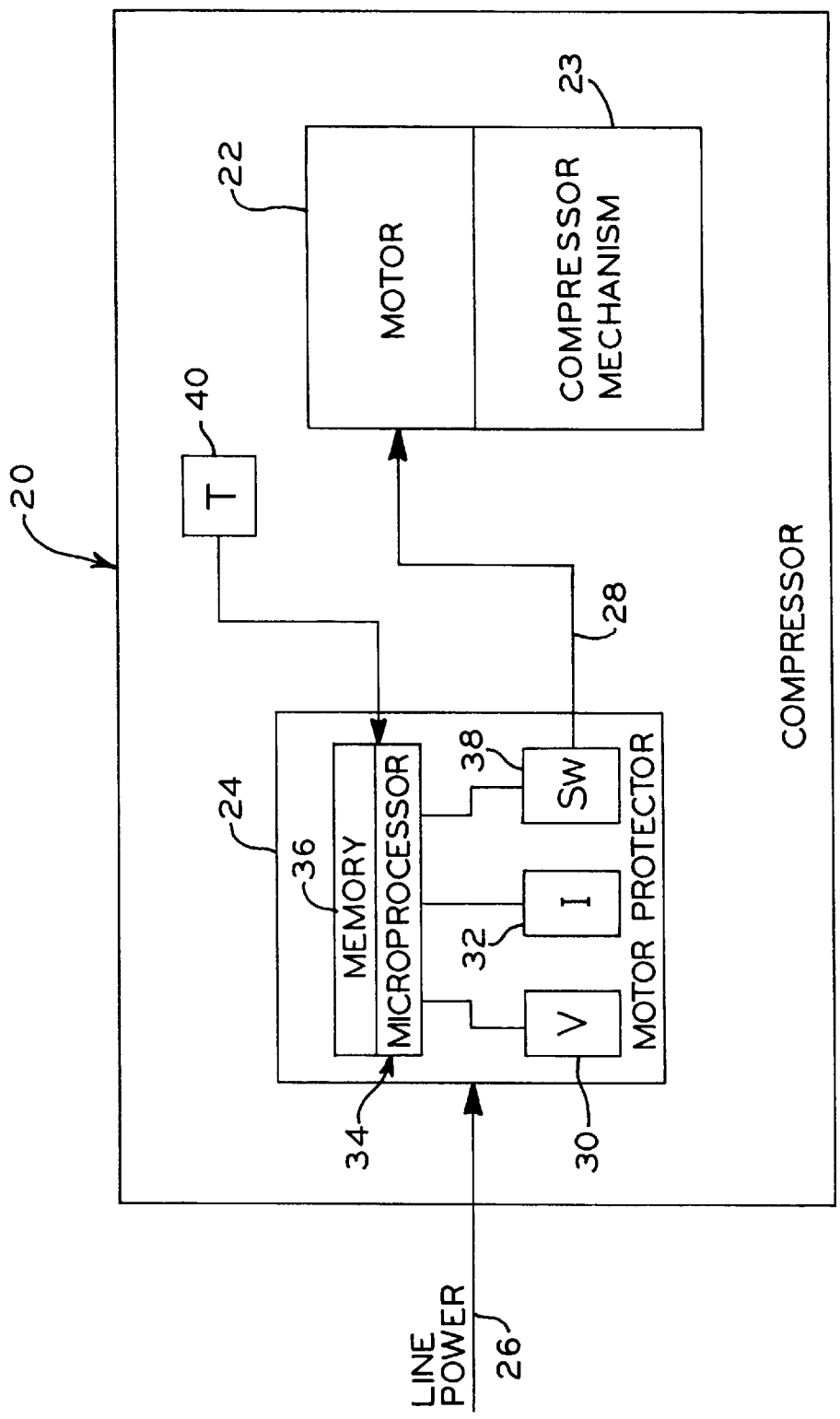
FIG. 1 is a schematic block diagram of a hermetic compressor motor microprocessor protection system according to the present invention.

Referring now to FIG. 1, hermetic refrigeration compressor 20, for example, a Model TP1380Y compressor manufactured by Tecumseh Products Company includes motor 22 which drives compressor mechanism 23, motor protector 24, input line power 26, and controlled line power 28 from motor protector 24 to motor 22. Motor protector 24 includes voltage sensor 30, current sensor 32, microprocessor 34 having memory 36 and switch 38. Voltage sensor 30 and current sensor 32 provide voltage and current signals respectively to microprocessor 34. Also, temperature sensor 40 mounted in compressor 20 provides a temperature signal to microprocessor 34. Input line power 26 is connected to switch 38 and microprocessor 34 controls switch 38 and controlled line power 28 to motor 22.

Memory 36 includes various operating ranges of motor 22 and instructions allowing microprocessor 34 to determine the operating state of motor 22 using the signals from voltage sensor 30, current sensor 32 and temperature sensor 40 and the operating ranges in determining if the compressor is operating within acceptable bounds. In this embodiment of the present invention, instructions allow microprocessor 34 to calculate the input motor power using the voltage signal and the current signal. As is well known, power is calculated by computing the product of the voltage (V) and current (I) and the cosine of the phase angle therebetween (V×I×cos φ). One of the operating ranges included in memory 36 is an input motor power limit range based on the torque limits of motor 22. The input motor power is then compared by microprocessor 34 to the input motor power limit range. If the calculated input motor power is outside the power limit range, microprocessor 34 will open switch 38 removing line power to motor 22. Memory 36 further includes instructions which allow microprocessor 34 to ignore this input motor power comparison until the motor has attained operating speed after start-up. The memory can also include instructions and operating ranges for determining other undesirable operating conditions, such as under and over voltages, under and over currents, and over temperature conditions.

Figure 2:
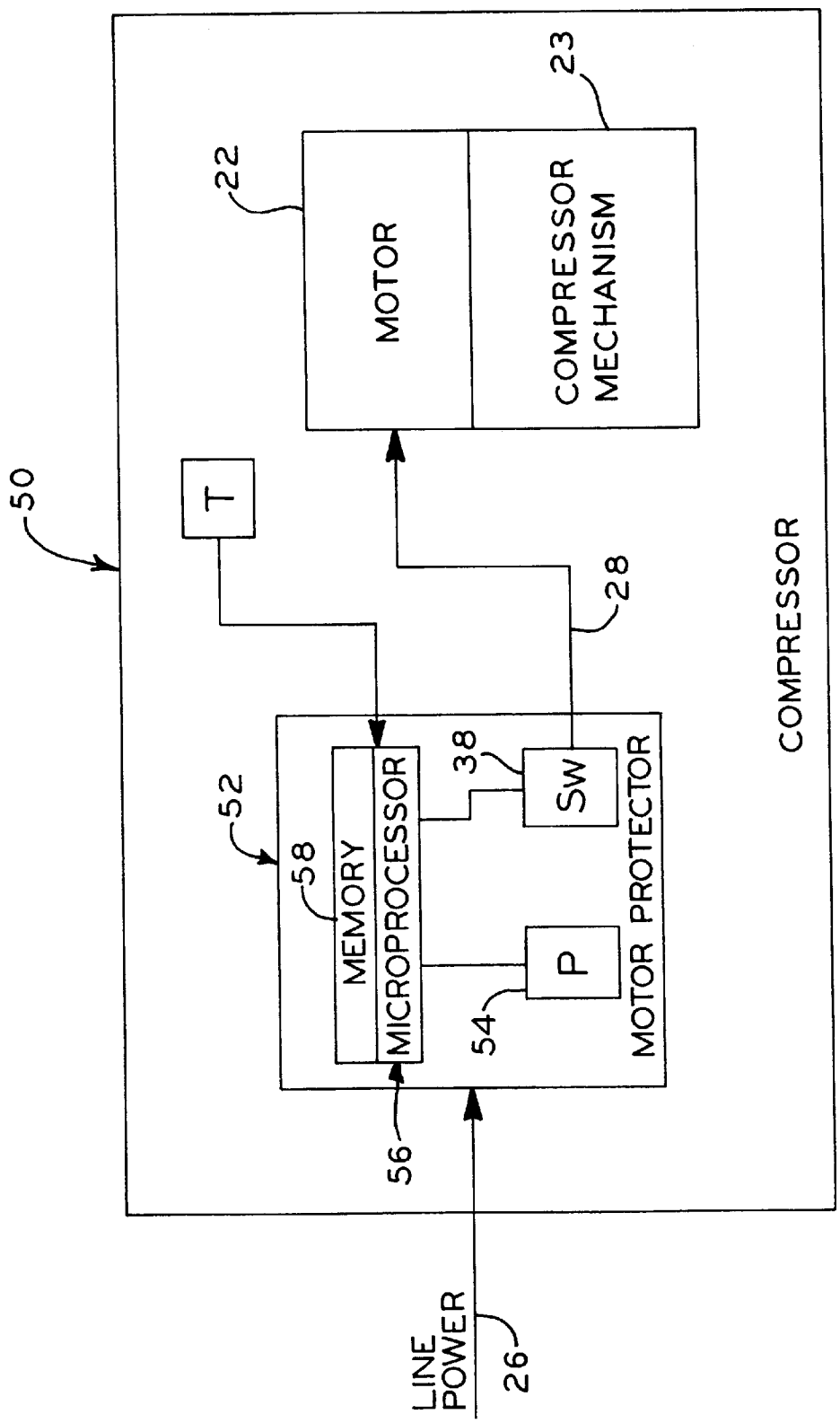
FIG. 2 is a schematic block diagram of a second embodiment of the hermetic compressor motor microprocessor protection device.

Now referring to FIG. 2, a second embodiment of the present invention is shown as refrigeration compressor 50, which is identical to compressor 20 except that motor protector 52 replaces motor protector 24. Motor protector 52 includes power sensor 54, microprocessor 56 having memory 58 and switch 38. Power sensor 54 provides an input motor power signal to microprocessor 56 which in turn controls switch 38 and controlled line power 28. Memory 58 includes an operating input motor power limit range based on the torque limits of motor 22 and instructions to compare the input motor power signal to the operating input motor power limit range. If the input motor power is outside the power limit range, microprocessor 34 will open switch 38 removing line power to motor 22.

Figure 3:
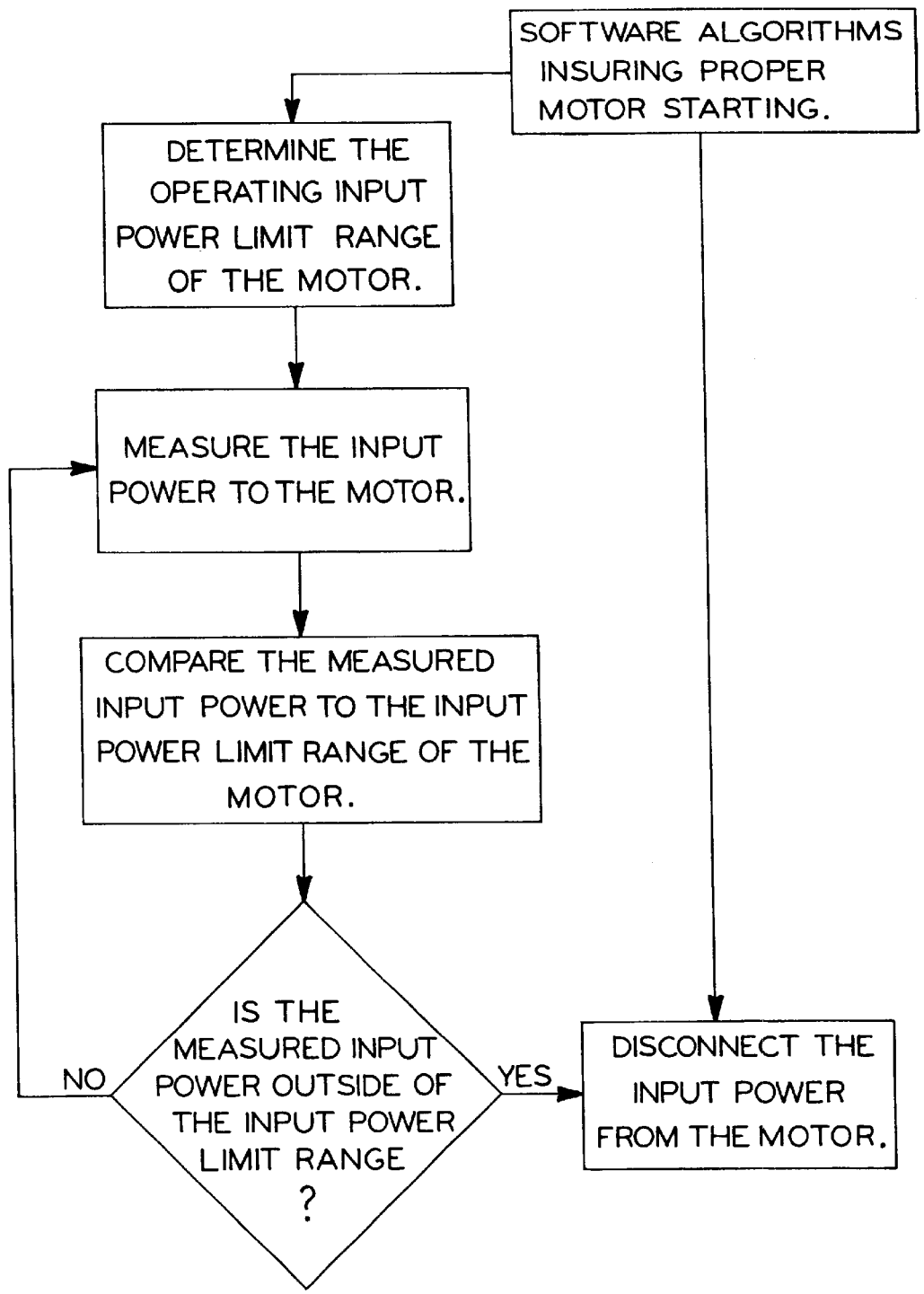
FIG. 3 is a flow diagram of a method of protecting a motor against operating outside of an established torque range.

Referring now to FIG. 3, the flow chart shows the program executed by the microprocessor and the method of using the input power to the motor to protect the motor from operating outside an acceptable torque operating range of the motor after the motor has attained operating speed. During start-up and prior to attaining operating motor speed, the following steps will be disabled by the microprocessor. The steps include determining the operating input power limit range based on the torque limits of the motor, measuring or calculating the input power to the motor, and comparing the input motor power to the operating input power limit range of the motor. If the measured input motor power is within the operating input power limit range of the motor, then the cycle is restarted at the step of measuring the input power. If the measured input power is outside the operating input power range of the motor, the input power to the motor is disconnected.

Determining an operating input power limit range of the motor based on the torque limits of the motor is accomplished using the information shown in the graph in FIG. 4. The graph shows the calculated speed-torque curves and the motor power input versus torque curves of a TP1380Y PSC motor at two extreme operating conditions: (1) 25° C., 127 line volts and (2) 100° C., 104 line volts. As shown, input motor power is very insensitive to these two operating conditions over the operating torque range of the motor. The graph of input power versus torque may be different for different types and sizes of motors, because the torque operating range will vary depending on the type and size of the motor. This requires a different determination of the operating input power limit range for different motors. Once the operating input power limit range is determined for the motor, the high power limit and low power limit are stored in the memory of the microprocessor.

Measuring the input power to the motor can be done in a variety of ways. A power measurement device can be used to determine the input power to the motor. In an alternative method voltage and current sensors can provide signals to a microprocessor, which then calculates the input power to the motor using these voltage and current signals.

Comparing the measured or calculated input motor power to the operating input power limit range of the motor stored in the memory of the microprocessor is accomplished using the instructions in the memory of the microprocessor. If the measured or calculated input motor power is within the determined operating input power limit range of the motor, the process is repeated to continuously measure or calculate the current input motor power and compare it to the operating input power limit range of the motor. If the input motor power is outside the determined operating input power limit range of the motor, the input power to the motor is disconnected.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A motor protector system for a refrigeration compressor, said system comprising:
   a motor;
   input power lines; and
   a motor protector connected to said input power lines to control the power to said motor, said motor protector including a microprocessor, an input power measurement device, and a switch means for controlling connection of said power lines to said motor, said input power measurement device including a motor power input signal to said microprocessor, said microprocessor including memory for storing an operating input power limit range of said motor and having instructions for comparing said power input signal to said operating input power limit range of said motor, said microprocessor controlling said switch means to open when said power input signal is outside of said operating input power limit range of said motor.

2. A motor protector system for a refrigeration compressor, said system comprising:
   a motor;
   input power lines; and
   a motor protector connected to said input power lines to control the power to said motor, said motor protector including a microprocessor, an input voltage measurement device, an input current measurement device, and a switch means for controlling connection of said power lines to said motor, said input voltage measurement device including a motor voltage input signal to said microprocessor, said input current measurement device including a motor current input signal to said microprocessor, said microprocessor including memory for storing an operating input power limit range of said motor and having instructions for calculating an input power value and for comparing said calculated power input value to said operating input power limit range of said motor, said microprocessor controlling said switch means to open when said calculated power input value is outside of said operating input power limit range of said motor.

3. A method of providing torque protection to a refrigeration compressor having a motor, a motor protector having a microprocessor with memory and an input power switch, the method comprising:

providing a motor protector having a microprocessor with memory and an input power switch;

storing an operating input power limit range based on the torque limits of the compressor motor in the memory of the microprocessor;

measuring the input power to the compressor motor;

providing the measured input power to the microprocessor;

comparing the measured input power value to the operating input power limit range of the compressor motor; and opening the input power switch to remove power from the compressor motor when the measured input power value is outside of the operating input power limit range.

4. The method of claim 3, wherein said step of measuring the input power to the compressor motor includes the steps of measuring the input voltage and input current to the compressor motor, providing the measured input voltage and input current to the microprocessor, and calculating the input power using the measured input voltage and input current.

5. In a refrigeration compressor having a motor and input power lines connected to said motor, the motor protector connected to the motor for controlling the power thereto, said protector comprising:

a switch connecting the power lines to the motor;

a microprocessor;

means for measuring input power to the motor and providing an input signal to the microprocessor;

a memory connected to the microprocessor for storing an operating input power limit range of said motor and having instructions for comparing the power input signal to the operating input power limit range of said motor;

said microprocessor controlling the switch means to open when the power input signal is outside of said operating power limit range of said motor.

6. The compressor of claim 5 wherein said means for measuring input power comprises a voltage sensor and a current sensor connected to the input power lines and said microprocessor includes means for calculating power based on the sensed voltage and current.

7. A method of providing torque protection to a refrigeration compressor having a motor, a motor protector and an input power switch, the method comprising:

providing a motor protector and an input power switch;

storing an operating input power limit range based on the torque limits of the compressor motor;

measuring the input power to the compressor motor;

comparing the measured input power value to the operating input power limit range of the compressor motor; and opening the input power switch to remove power from the compressor motor when the measured input power value is outside of the operating input power limit range.

* * * * *